US008681658B2

(12) United States Patent
Chen et al.

(10) Patent No.: US 8,681,658 B2
(45) Date of Patent: *Mar. 25, 2014

(54) SYSTEM AND METHOD TO PROVISION AN MPLS/VPN NETWORK

(71) Applicant: AT&T Intellectual Property I, L.P., Atlanta, GA (US)

(72) Inventors: Wenge Chen, Austin, TX (US); Holly Chen, San Ramon, CA (US); Kuo-Hui Liu, San Ramon, CA (US); Shih Chung Soon, Dublin, CA (US); Bei Zhou, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,000

(22) Filed: Oct. 23, 2012

(65) Prior Publication Data

US 2013/0107753 A1 May 2, 2013

Related U.S. Application Data

(63) Continuation of application No. 12/244,120, filed on Oct. 2, 2008, now Pat. No. 8,339,992, which is a continuation of application No. 10/736,445, filed on Dec. 15, 2003, now Pat. No. 7,450,598.

(51) Int. Cl.
*H04L 12/28* (2006.01)
*H04L 12/46* (2006.01)
*H04L 12/24* (2006.01)
*H04L 12/56* (2011.01)

(52) U.S. Cl.
CPC ........... *H04L 12/4641* (2013.01); *H04L 41/08* (2013.01); *H04L 41/0803* (2013.01); *H04L 41/0806* (2013.01); *H04L 41/0893* (2013.01); *H04L 45/50* (2013.01); *H04L 41/0883* (2013.01)
USPC ........... 370/254; 370/223; 370/230; 370/234; 370/401

(58) Field of Classification Search
None
See application file for complete search history.

(56) References Cited

U.S. PATENT DOCUMENTS 6,529,513 B1    3/2003    Howard et al.
6,532,088 B1    3/2003    Dantu et al.

(Continued)

FOREIGN PATENT DOCUMENTS

WO    WO02098046 A2    12/2002
WO    WO02099571 A2    12/2002

(Continued)

OTHER PUBLICATIONS

E. Rosen et al., "BGP/MPLS VPNs", Mar. 1999, Network Working Group, Request for Comments: 2547.*

(Continued)

*Primary Examiner* — Ayaz Sheikh
*Assistant Examiner* — Peter Chau
(74) *Attorney, Agent, or Firm* — Toler Law Group, PC

(57) ABSTRACT

Systems and methods of automatically determining a set of route targets is provided. The method includes receiving network topology data specifying configuration of a network. The method also includes automatically converting the network topology data into route targets to be assigned to virtual routing and forwarding elements. The route targets are grouped into sets and duplicate sets of route targets are removed. The method further includes generating a data record including information related to the set of route targets.

16 Claims, 9 Drawing Sheets

(56) References Cited

U.S. PATENT DOCUMENTS

| | | | |
|---|---|---|---|
| 6,594,268 | B1 | 7/2003 | Aukia et al. |
| 6,909,696 | B1 | 6/2005 | Zavgren, Jr. |
| 7,024,472 | B1 | 4/2006 | Datta et al. |
| 7,450,598 | B2 | 11/2008 | Chen et al. |
| 8,339,992 | B2 | 12/2012 | Chen |
| 8,400,941 | B2 * | 3/2013 | Gray et al. ............ 370/254 |
| 2002/0181477 | A1 | 12/2002 | Mo et al. |
| 2002/0186664 | A1 | 12/2002 | Gibson et al. |
| 2002/0191541 | A1 | 12/2002 | Buchanan et al. |
| 2003/0079043 | A1 | 4/2003 | Chang et al. |
| 2004/0030786 | A1 * | 2/2004 | Zehavi ............ 709/229 |
| 2004/0037275 | A1 | 2/2004 | Li et al. |
| 2004/0059829 | A1 * | 3/2004 | Chu et al. ............ 709/238 |
| 2004/0059831 | A1 * | 3/2004 | Chu et al. ............ 709/242 |
| 2004/0093492 | A1 | 5/2004 | Daude et al. |
| 2004/0255028 | A1 | 12/2004 | Chu et al. |
| 2004/0261116 | A1 | 12/2004 | McKeown et al. |
| 2005/0083955 | A1 | 4/2005 | Guichard et al. |
| 2005/0251568 | A1 | 11/2005 | Zavgren |
| 2006/0215578 | A1 | 9/2006 | Andrapalliyal et al. |
| 2007/0226325 | A1 | 9/2007 | Bawa et al. |
| 2007/0226630 | A1 | 9/2007 | Farid et al. |
| 2008/0101385 | A1 | 5/2008 | Elias et al. |
| 2009/0028068 | A1 | 1/2009 | Chen et al. |

FOREIGN PATENT DOCUMENTS

| | | |
|---|---|---|
| WO | WO02100043 A1 | 12/2002 |
| WO | WO03009528 A1 | 1/2003 |

OTHER PUBLICATIONS

Nadeau et al., "MPLS/BGP Virtual Private Network Management Information Base using SMIv2", Nov. 2002, IETF Internet Draft.*

Metz, Chris, "The Latest in Virtual Private Networks: Part I", Internet Computing, IEEE vol. 7, Issue 1, Jan.-Feb. 2003, pp. 87-91.

* cited by examiner

Table 1: EXAMPLE OF MPLS/VPN SERVICE PROVISIONING TABLE 102

| | | Customer A | | | | | | | | | | Customer B | | |
|---|---|---|---|---|---|---|---|---|---|---|---|---|---|---|
| | | CE1 | CE2 | CE3 | CE4 | CE5 | CE6 | CE7 | CE8 | CE9 | CE10 | CE11 | CE12 | CE13 |
| VPN1 | Topology Full Mesh | √ | | | | | | | | | | | | |
| VPN2 | Full Mesh | √ | | | | | | | | | | | √ | |
| VPN3 | Full Mesh | | √ | | | | | √ | | | | | | |
| VPN4 | Central Service | | Server | | Client | | | | Server | Client | | Client | | |
| VPN5 | H&S 2 VRFs | √ Spoke | | √ Hub | | √ Spoke | √ Hub_Spk | √ Hub_Hub | | √ Spoke | | | | |
| VPN6 | H&S 1 VRF | | | | | | | | | | √ Spoke | √ Spoke | √ Spoke | √ Spoke |
| L2 requirement (Encapsulation, CRC, Clock, ATM VC, etc) | | Aal5snap VBR2M/ 2M/32 | PPP CRC 32 | PPP CRC 32 | FR CRC 32 | PPP CRC 32 | Aal5snap UBR 512K | FR 256K | | PPP CRC 16 | HDLC CRC 32 | PPP CRC 32 | FR CRC 32 | PPP CRC 16 |
| L3 requirement Routing Area/AS, etc. | | OSPF Area 0 | EBGP 9999 | RIP | OSPF Area 0 | OSPF Area 7 | Static | OSPF Area 0 | RIP | EBGP 9999 | EBGP 1777 | OSPF Area 1 | RIP | Static |
| Location of CE | | LA | SF | SF | LA | SJ | SJ | SJ | SJ | SF | LA | SF | LA | LA |
| IP interface on PE | | PE1 ATM4/ 4.10 | PE2 POS3/0 | PE2 S7/1 | PE1 S7/2 | PE3 S7/1 | PE3 ATM4/ 0.1 | PE3 S1/0/15.0 | PE3 GE2/0 | PE2 POS3/1 | PE1 S5/1 | PE2 S7/7 | PE1 S7/4 | PE1 POS3/ 1 |
| IP address/mask | | IP address/mask can be assigned manually or automatically from IP address pools. | | | | | | | | | | | | |
| Inbound QoS (profile #) | | 1 | 2 | 4 | 4 | 4 | 9 | 10 | 5 | 2 | 4 | 7 | 8 | 4 |
| Outbound QoS (profile #) | | 1 | 2 | 3 | 3 | 3 | 9 | 10 | 5 | 2 | 4 | 7 | 8 | 3 |
| MD5 | | Y | Y | Y | Y | Y | | Y | Y | Y | Y | Y | Y | |
| Others | | | | | | | | | | | | | | |

Part 1 202 (VPN1–VPN6 rows)
Part 2 204 (L2/L3/Location/IP rows)
Part 3 206 (QoS/MD5/Others rows)

*FIG. 2*

LOGICAL MAPPING OF VRF AND ASSOCIATED RTs TO VPN FOR DIFFERENT TOPOLOGIES

FM = FULL MESH   HB1 = ONE VRF BASED HUB AND SPOKE   HB2 = TWO VRF BASED HUB AND SPOKE
CS = CENTRAL SERVICE   n = SEQUENCE NUMBER OF VPN   m = SEQUENCE NUMBER OF CE

| VPN TOPOLOGY | VRF (IN BOLD) AND RTS (IN ITALIC) | | | NOTES |
|---|---|---|---|---|
| FULL MESH 310 | VRF_FM_n *Both FM_n* | | | One VRF on Each PE<br>• One RT per VRF |
| H&S TWO VRFS BASED 312 | VRF_HS2_HUB_Hub<br>*Import HS2_n_Hub* | VRF_HS2_HUB_Spoke<br>*Export HS2_n_Spoke* | VRF_HS2_Spoke_m<br>*Export HS2_n_Hub*<br>*Export HS2_n_Spoke* | One VRFs for each CE (even on PE)<br>• One unique RT for HUB_Hnb VRF<br>• One unique RT for HUB_Spoke VRF<br>• Two RTs for each spoke CE VRF but they are same for all CE VRF on different Pes. |
| H&S ONE VRF BASED (WITH DEFAULT ROUTE) 314 | VRF_HS1_HUB<br>*Export HS1_n-Spoke*<br>*Import HS1_n_Hub* | | VRF_HS1_Spoke_m<br>*Export HS1_n_Hub*<br>*Import HS1_n_Spoke* | One VRFs for each CE (even on PE)<br>• Two RTs for HUB VRF<br>• Two RTs for Spoke CE VRF but they are same for all CE VRF on different Pes. |
| CENTRAL SERVICE 316 | VRF_CS_n_Server<br>*Both CS_n_Server*<br>*Import CS_n_Server_Import* | | VRF_CS_n_Spoke_m<br>*Export CS_n_Server_Import*<br>*Import CS_n_Server* | One VRF for each CE<br>• Two RTs for Server VRF<br>• Two RTs for each Spoke VRF |

*FIG. 3*

EXAMPLE VRFs AND ASSOCIATED RTs ON EACH PE

ON PE1 440

| | Topology | CE1 | CE4 | CE10 | CE12 | CE13 |
|---|---|---|---|---|---|---|
| VPN1 402 | Full Mesh | Both FM_1 | Both FM_1 | Both FM_1 | Both FM_1 | Both FM_1 |
| VPN2 404 | Full Mesh | Both FM_2 | Both FM_2 | | | |
| VPN3 406 | Full Mesh | | | Both FM_3 | | |
| VPN4 408 | Central Service | | Export CS_4_Server_Import Import CS_4_Server_Import | | | |
| VPN5 410 | H&S 2 VRFs | Export HS2_5_Hub Import HS2_5_Spoke | | Export HS1_6_Hub Import HS1_6_Spoke | Export HS1_6_Hub Import HS1_6_Spoke | Export HS1_6_Hub Import HS1_6_Spoke |
| VPN6 412 | H&S 1 VRF | | | | | |
| VRF on PE1 414 | | VRF_1 | VRF_2 | VRF_3 | VRF_4 432 | |

ON PE2 450

| | Topology | CE2 | CE3 | CE9 | CE11 |
|---|---|---|---|---|---|
| VPN1 | Full Mesh | Both FM_1 | | Both FM_1 | |
| VPN2 | Full Mesh | | | | |
| VPN3 | Full Mesh | | Both FM_3 | | Both FM_3 |
| VPN4 | Central Service | Both CS_4_Server_Import CS_4_Server_Import | | Export CS_4_Server_Import Import CS_4_Server_Export | Export CS_4_Server_Import Import CS_4_Server_Export |
| VPN5 | H&S 2 VRFs | | Export HS1_6_Spoke Import HS1_6_Hub | Export HS1_5_Hub Import HS1_5_Spoke | |
| VPN6 | H&S 1 VRF | | | | Export HS1_6_Hub Import HS1_6_Spoke |
| VRF on PE2 | | VRF_1 | VRF_2 | VRF_3 | VRF_4 |

| | Topology | CE5 | CE6 | CE7 | CE8 |
|---|---|---|---|---|---|
| VPN1 | Full Mesh | | | | |
| VPN2 | Full Mesh | | | Both FM_2 | Both FM_3 |
| VPN3 | Full Mesh | | | | |
| VPN4 | Central Service | | | | Both CS_4_Server Import CS_4_Server_Import |
| VPN5 | H&S 2 VRFs | Export HS2_5_Hub Import HS2_5_Spoke | Export HS2_5_Spoke | Import HS2_5_Hub | Export HS2_5_Hub ImportHS2_5_Spoke |
| VRF on PE3 | | VRF_1 | VRF_2 | VRF_3 | VRF_4 |

*FIG. 4B*

| *FIG. 4A* |
|---|
| *FIG. 4B* |

*FIG. 4B*

SYSTEM AND METHOD TO PROVISION AN MPLS/VPN NETWORK

CLAIM OF PRIORITY

The present application claims priority from and is a continuation of U.S. patent application Ser. No. 12/244,120, filed on Oct. 2, 2008 and titled "SYSTEM AND METHOD TO PROVISION MPLS/VPN NETWORK," which claims priority from and is a continuation of U.S. patent application Ser. No. 10/736,445, filed on Dec. 15, 2003, now issued as U.S. Pat. No. 7,450,598, and titled "SYSTEM AND METHOD TO PROVISION MPLS/VPN NETWORK," the contents of each of which are expressly incorporated herein by reference in their entirety.

FIELD OF THE DISCLOSURE

The present disclosure relates generally to provisioning procedures for networks.

BACKGROUND

In connection with the deployment of high speed data communications networks, manual methods and some forms of automated provisioning software tools have been used. Some of such provisioning tools are available for multi protocol label switching (MPLS) virtual private network (VPN) services.

However, these provisioning tools have some significant drawbacks. For example, operators are required to have an in-depth understanding of the technical details of the MPLS BGP/VPN technology and how to translate a customer's general requirement into such technical details. The operator is required to provide technical details and make technical decisions, such as the specific assignment and deployment of virtual routing and forwarding (VRFs), route targets (RTs), routing redistribution, site of origin, and other similar technical network details.

Secondly, these approaches/tools typically require operators to provision each customer edge router/provider edge router (CE-PE) access individually, again requiring knowledge of technical details, which makes the provisioning process/procedures complex and error prone. The troubleshooting of mistakes made during this process is usually difficult and costly.

Thirdly, these approaches/tools do not provide the flexibility needed to easily accommodate new VPN topology and service changes. Accordingly, there is a need for an improved system and method of provisioning MPLS/VPN systems.

BRIEF DESCRIPTION OF DRAWINGS

FIG. 2 is a general diagram that illustrates an MPLS/VPN service provisioning table.

FIG. 3 is a general diagram that illustrates a rule set for VRF and RT mapping.

FIGS. 4A and 4B are general diagrams that illustrates tables for VPN to CE mapping for various PE elements.

DETAILED DESCRIPTION

The present disclosure is generally directed to a method of provisioning a virtual private network and a computer network operations system that is configured to provide such provisioning. In a particular embodiment, the automated method of provisioning a virtual private network includes receiving a high level description of a topology of a network, applying a set of rules to the topology of the network to produce a plurality of route targets (RTs) associated with virtual private networks to be assigned to the network, grouping a set of route targets from the plurality of route targets with respect to each customer equipment node within the network to form a group of route target sets, removing duplicate sets of route targets from the group of route target sets to form a reduced size set of route targets; assigning each set of route targets in the reduced size set of route targets to a VRF all the CEs with the same RT set on one PE should share one VRF, and generating an output file including output data that identifies each of the VRFs and the associated route targets assigned to each of the VRFs.

In a particular embodiment, the computer network operations system includes a terminal having a display portion, a data input device to receive input from a user, and a computer system having a memory and a processor. The computer system is coupled to the terminal and to the data input device. The display portion of the terminal provides an input screen having a data format configured to prompt the user to provide high-level network topology data via the data input device. The high-level network topology data includes virtual private network information with respect to a backbone data network. The computer system converts the high-level network topology data into a set of route targets to be assigned to VRFs. The set of assigned route targets are stored in the memory.

The disclosed method and system provides a new service provision interface that allows operator use without requiring many of the specific technical network details. Further, the translation from a customer's requirements into technical network configuration commands are handled using an automated method that is transparent to the operator. The technical requirements for operators are significantly reduced allowing operators with less technical experience can be trained at a lower cost. Further, the VPN service order process to be handled more efficiently and more quickly. Also, due to automation, the number of mistakes made during the provisioning process is reduced.

In addition, the disclosed service provisioning method allows provisioning in an efficient manner using an overall system view instead of a link by link method. The disclosed provisioning system may consider the cost of assigning VRFs as well as access costs when determining which provider edge router (PE) a particular customer edge router (CE) is to be attached to.

Figure 1:
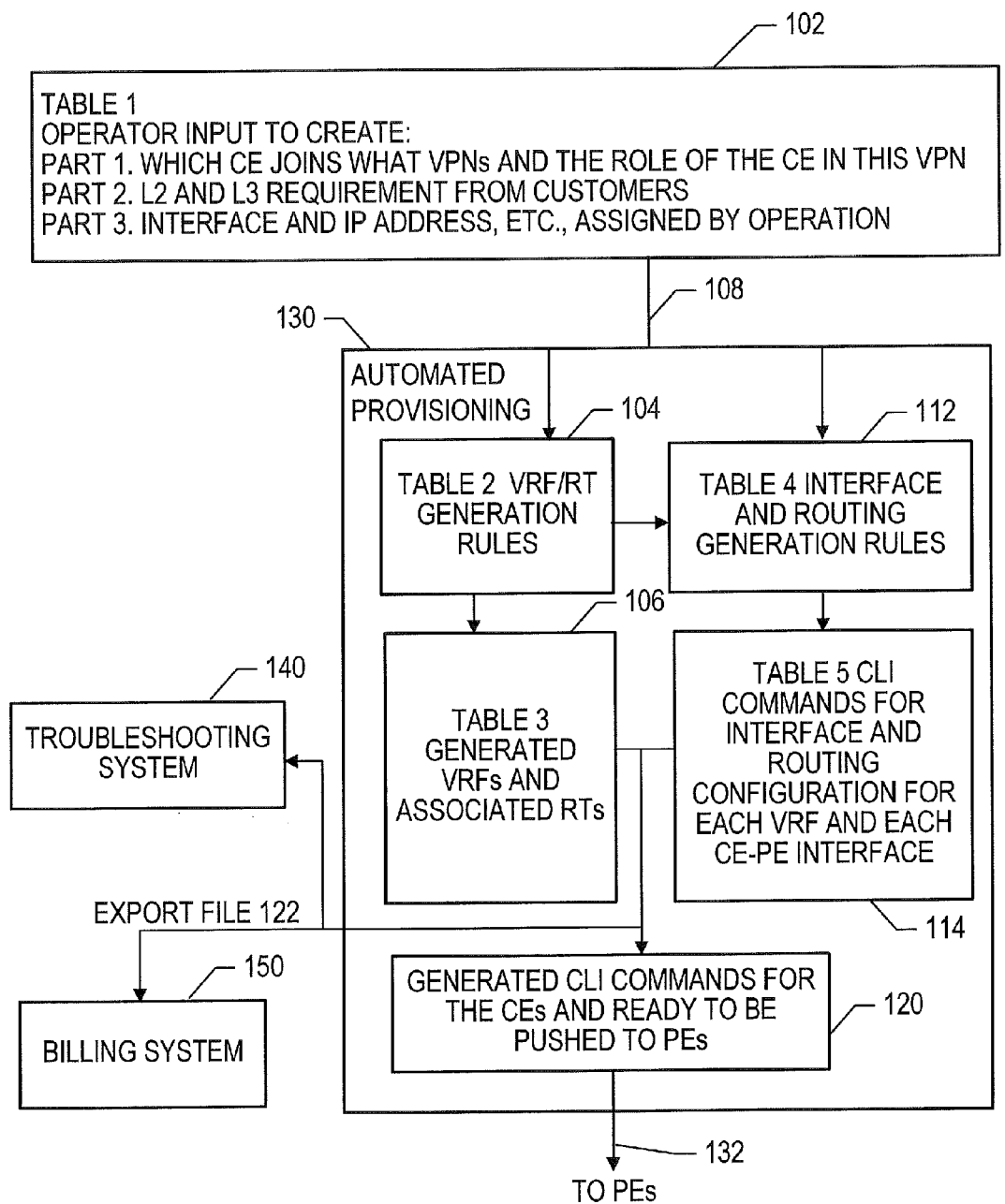
FIG. 1 is general diagram that illustrates an automated provisioning process.

Referring to FIG. 1, a flow diagram that illustrates a particular embodiment of a provisioning procedure is shown. The flow diagram includes a first table 102 that is formed by operator input and includes an automated provisioning system 130 that includes a plurality of additional tables created by an automated software tool. The output 132 from the automated provisioning processing is a set of commands that are deployed to a network, such as to various PE nodes within an MPLS network. Data files 122 may be exported from the automated provisioning system 130 and sent to other systems, such as a troubleshooting system 140 or a billing system 150. The data files 122 provided by the provisioning system 130 are often useful to technical support personnel in resolving technical problems reported by customers, such as issues relating to network configurations and performance. Also, the billing system 150 may use input from the exported file 122 to add new billing parameters and to charge for use of network resources, such as charges based on the number of virtual routing and forwarding elements (VRFs) used by a particular VPN topology. Thus, the cost of assigning VRFs may be considered in the bills sent to customers.

The operator inputted table 102 includes a first part that includes data to identify customer edge router (CE) and associated VPNs. A second part of the table 102 identifies layer 2 and layer 3 network requirements received from customers. The third part of the operator table 102 includes interfaces and IP address assignments. A resulting data table 108 is provided to the automated provisioning system 130. Within the provisioning system 130 a set of, VRF/RT rules 104 are used to generate a table 106 that includes assigned VRFs and RTs. Also, a table 112 having interface and routing generation rules is used to create CLI commands, such as in table 114, for each VRF and each associated CE-PE interface. The outputs from the generated VRFs and RTs and the CLI commands are communicated to a module 120 to generate CLI commands for the CEs and prepare data to be communicated to PEs. The resulting data output 132 is then deployed to PEs to deploy the provisioned topology in the network. An example of a VRF is found within a commercial router, such as those made by Cisco, Inc., that are deployed in distributed data communication networks.

Referring to FIG. 2, an example of the operator inputted table 102 is illustrated. The table 102 includes a first portion 202, a second portion 204, and a third portion 206. The first portion 202 includes VPN to CE mapping and topology selection for each VPN. The second portion 204 identifies the layer 2 and layer 3 network requirements and CE locations. The third portion 206 identifies IP interface on PE and IP address and quality of service (QoS) requirements and profiles. Customer information is also included in table 102, such as the customer A and customer B in the first row; CE1-CE11 belong to customer A and CE12-CE13 belong to Customer B.

Referring to FIG. 3, a logical mapping table of VRFs and associated RTs is shown. The logical mapping table includes row entries of full mesh 310, hub and spoke with two VRFs 312, hub and spoke with one VRF 314, and a central service row 316. The column entries include the assigned RTs and VRFs 330, 332, 334, and a comments column 306.

Referring to FIGS. 4A and 4B, VRF and RT mapping tables 440, 450, and 460 for multiple PEs are shown. A first table 440 for PE1 includes a plurality of VPN row elements 402-412, a VRF indicator row 414, and a plurality of CE columns 422-430. The table 440 also includes a topology indication column 420. As shown, one of the VRFs, VRF_4 labeled 432 is shared by two CEs, CE12 in column 428 and CE13 in column 430. By providing for a shared VRF, the number of used VRFs for the desired VPN topology is beneficially reduced and for a large network provides for reduced VRF deployment costs. Thus, the resulting set of VRFs is a reduced size set. In accordance with the VRF generation rules, RTs are assigned for each CE based on its topology Table 1 and the RT generation rules in Table 2. If multiple CEs share the same RT set, such as the last CE12 and CE13, then they share one VRF. Generally, each VRF owns all the RTs in its column. However, all the CE members of one full mesh VPN belong to another full mesh VPN, which means that one VPN is the subset of another VPN. Therefore, the corresponding VRF may not need the RT of the subset VPN if it makes no difference to the customers.

Dualhoming requirement can also be handled with respect to Table 1. There are 3 common scenarios for dualhoming:
1. Two CEs connecting to two PE by two physical or logical links.
   This scenario can be handled by Table 1 natively.
2. One CE connecting to two PE by two physical or logical links
   Two columns for each CE are used. Part 1 for these two columns are the same. There may be the same or different L2 or L3 requirement in part 2, one IP interface and IP address/mask on each PE in part 3.
3. One CE connecting to one PE by two parallel physical links or logical links.
   Two columns for each CE are used. Part 1 for these two columns are the same. There may be the same or different L2 or L3 requirement in part 2, operation needs to assign two IP interfaces and two IP addresses/masks on the PE.

The "Site" concept in industry standard RFC2547bis can also be easily integrated into Table 1 by adding a row named "Site" in Table 1 which tells which site each CE belongs to. If a customer wants the traffic between two or more CEs go through its private network only, which means that customer does not rely on the SP network as both primary and backup connection for these CEs, these CEs should be assigned to one site. The same SOO (Site of Origin) should be configured for the CE-PE interfaces on PEs to avoid routing loop if EBGP is used as the CE-PE routing protocol.

Figure 5:
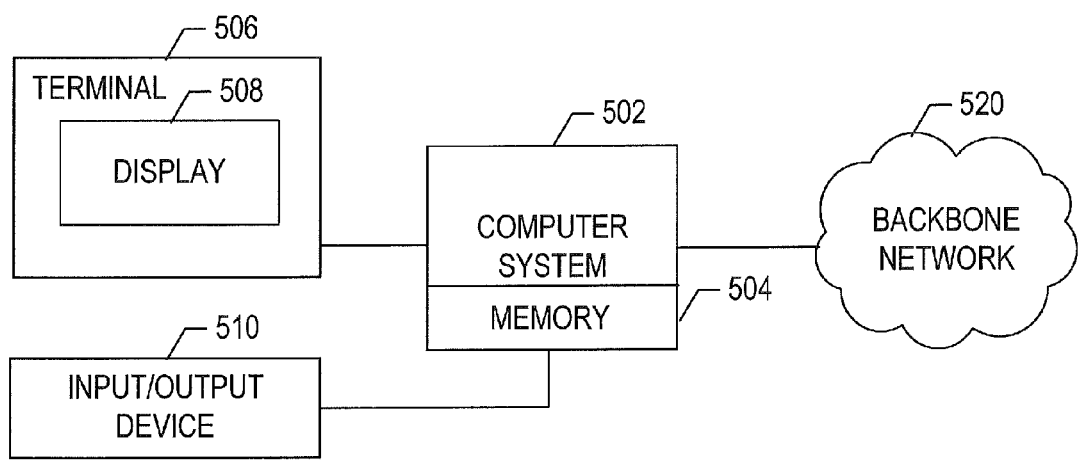
FIG. 5 is a block diagram to illustrate a network and computer system that may be used to execute a provisioning process.

Referring to FIG. 5, a sample operations system for implementing the disclosed provisioning procedure is shown. The operations system includes a computer system 502 with a memory 504. The computer system 502 is coupled to a backbone network 520, such as a MPLS network. The computer system 502 has an input/output device 510 and a terminal 506 with a display 508 used to interface to network operations personnel. Computer software that can receive an operator input table and can perform automated provisioning procedures to deploy VRF and RT assignments for network elements within the backbone network 520 can be disposed in the memory 504 and executed by the computer system 502. An example of a suitable computer system 502 is a commercially available personal computer or workstation.

Figure 6:
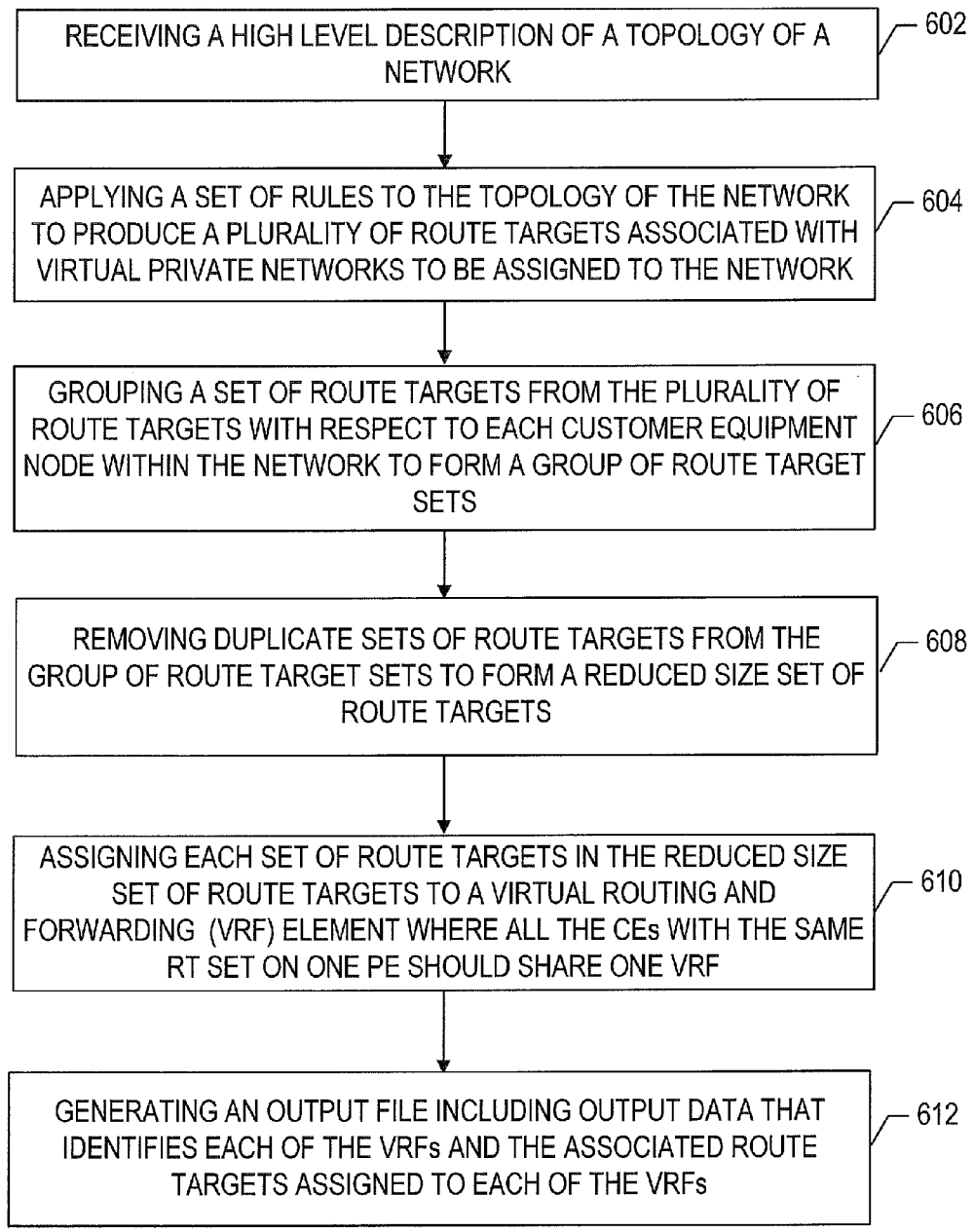
FIG. 6 is a flow diagram that illustrates a particular provisioning procedure.

Referring to FIG. 6, a particular embodiment of a method of provisioning a network is illustrated. A high level description of a network topology, such as the table 102 of FIG. 1, is received, at 602. A set of provisioning rules is applied to the topology of the network to produce a plurality of route targets (RTs) associated with virtual private networks to be assigned to the network, at 604. A set of route targets from the plurality of route targets is grouped with respect to each customer edge router (CE) within the network to form a group of route target sets, at 606. Duplicate sets of route targets are removed from the group of route targets to form a reduced size set of route targets, at 608. Each set of route targets in the reduced size set of route targets is assigned to a virtual routing and forwarding (VRF) element all the CEs with the same RT set on one PE should share one VRF, at 610. By reducing the number of route targets and by sharing VRFs, less network resources are consumed by the desired network topology. An output file is generated, at 612, that includes output data that identifies each of the VRFs and the associated route targets assigned to each of the VRFs. The output file may be deployed to physical network equipment to complete the provisioning process.

Figure 7:
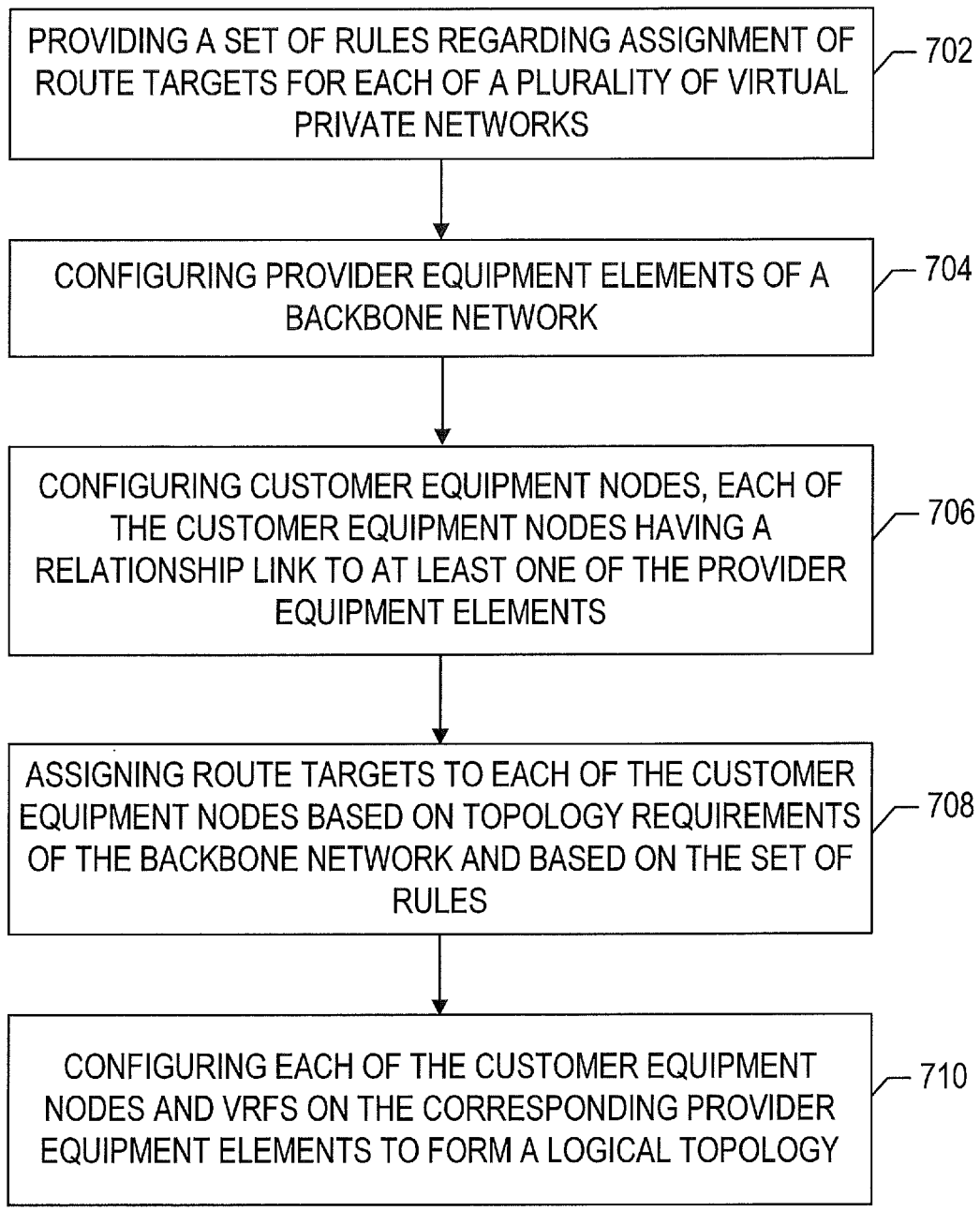
FIG. 7 is a flow diagram that illustrates other aspects of a provisioning procedure.

Referring to FIG. 7, another particular embodiment of a method of provisioning is illustrated. A set of rules is provided regarding assignment of route targets for each of a plurality of virtual private networks, at 702. Provider edge routers (PE) of a backbone network are configured, at 704. Customer edge routers (CE) are configured, at 706. Each of the CE nodes has a relationship link to at least one of the PE elements. Route targets are assigned to each of the CE nodes based on topology requirements of the backbone network and based on the set of rules, at 708. An example of the set of rules is the table of rules illustrated in FIG. 3. Each of the CE nodes and VRFs are configured with respect to the corresponding PE elements to form a logical network topology, at 710. The logical topology may be converted into an output file that is deployed in physical router equipment, to thereby provision such equipment.

Figure 8:
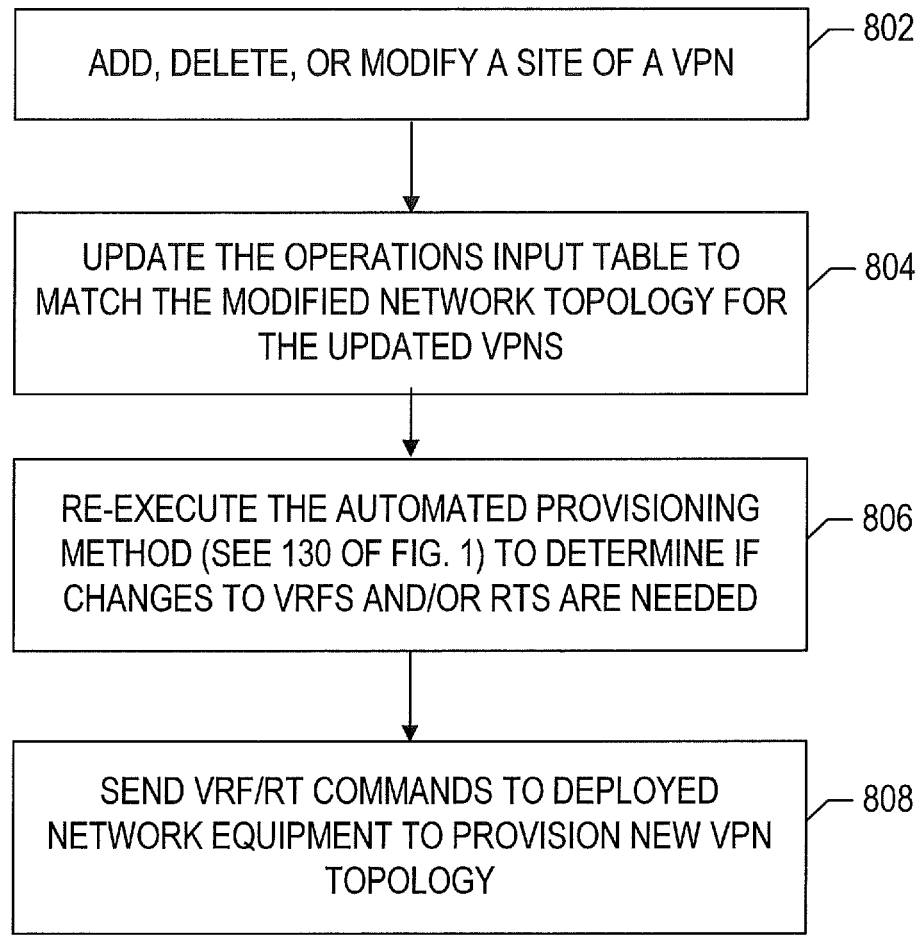
FIG. 8 is a flow diagram that illustrates a method of provisioning a modified topology.

Referring to FIG. 8, a method of provisioning for a modified network topology is shown. A particular site or a particular VPN is added, deleted, or modified, at 802. This modification results in a changed topology. The operations table, such as the illustrated operator input table 102, is updated to correspond to the modified topology including updated VPNs, at 804. For example, a customer may add, delete, or change a desired VPN. The automated provisioning method (see system 130 of FIG. 1) is re-executed using the updated operations table as its input to determine whether any changes are needed to VRFs or RTs for the network, at 806. If changes are needed, a necessary set of VRF/RT commands to deployed network equipment is provided to provision the modified topology, at 808. Thus, a method of automatically provisioning a desired VPN network that can also handle modifications to the desired VPN topology with reduced reliance on operator technical ability has been disclosed.

As a particular example, when adding a new site to one or multiple existing VPNs, the provisioning steps described above with respect to FIG. 1 are repeated with adding the new CE column and the provision system 130 will automatically decide if a new VRF need to be added for this new site or just let this new CE join an existing VRF. When delete a site from existing VPN services, the provisioning steps described with respect to FIG. 1 are repeated with deleting the CE and the provision system 130 will automatically decide if the CE attached VRF need to be deleted or not. When changing a VPN topology, the above described steps are repeated with modified VPN topology and the role of each CE in this topology, and the provision system 130 will automatically determine the VRFs and associated RTs. When adding a new VPN, the above described provisioning steps are repeated with modified VPN topology and the role of each CE in this topology, and the provision system will automatically decide the VRFs and associated RTs. When deleting an existing VPN, the provisioning steps are repeated with deleting the VPN and the provision system will automatically decide the VRFs and associated RTs.

The disclosed provisioning system may feed the information of how many VRFs need to be used for each customer into billing system to easily support billing of MPLS/VPN services based on both the cost of VRFs as well as access costs since VRF is a limited resource in PE routers. The disclosed method and system provides a new service provision interface that allows operator use without requiring many of the specific technical network details, such as VRF, RT, SOO, route redistribution, etc. Further, the translation from a customer's requirements into technical network configuration commands are handled using an automated method that is transparent to the operator. The disclosed service provisioning method allows provisioning in an efficient manner using an overall system view instead of a link by link method.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising
applying one or more rules to network topology data of a network to produce a plurality of route targets, wherein the network includes customer edge routers and provider edge routers;
grouping a set of route targets from the plurality of route targets to produce a group of route target sets;
removing duplicate route target sets from the group of route target sets to produce a reduced size of route target sets;
generating a data record including information related to the group of route target sets based on the reduced size of route target sets;
storing the data record in a memory, wherein the memory includes data to map route target data for each of a plurality of provider edge routers of the network, and wherein the data indicates that two or more of the customer edge routers of the network that have a same set of route targets on a corresponding provider edge router of the network share a virtual routing and forwarding element; and
provisioning the network based on the data record.

2. The method of claim 1, wherein provisioning the network based on the data record comprises:
generating one or more configuration commands based on the data record; and
sending the one or more configuration commands to at least one network element to configure the network.

3. The method of claim 1, wherein the network is a multi-protocol label switching network.

4. The method of claim 1, wherein the network topology data includes a plurality of data entries, wherein a first portion of each data entry identifies customer edge routers, a second portion of each data entry identifies provider edge routers corresponding to each of the customer edge routers, and a third portion of each data entry identifies a topology type for each of a plurality of virtual private networks.

5. The method of claim 4, wherein the topology type is selected from central service and hub and spoke topology types.

6. The method of claim 4, wherein the topology type is full mesh.

7. A system comprising:
a processor;
a memory including a plurality of rules; and
logic executable by the processor to:
apply at least one of the plurality of rules to network topology data to produce a plurality of route targets, the network topology data specifying a configuration of a network, wherein the network includes customer edge routers and provider edge routers;
group a set of route targets from the plurality of route targets with respect to each customer edge router within the network to produce a group of route target sets;

remove duplicate route target sets from the group of route target sets to produce a reduced size of route target sets;
generate a data record including information related to the group of route target sets based on the reduced size of route target sets;
store the data record in the memory, wherein the memory includes data to map route target data for each of a plurality of provider edge routers of the network, and wherein the data indicates that two or more of the customer edge routers of the network that have a same set of route targets on a corresponding provider edge router of the network share a virtual routing and forwarding element; and
provision the network based on the data record that is stored in the memory.

8. The system of claim 7, wherein provisioning the network based on the data record includes generating network commands to configure the network.

9. The system of claim 7, further comprising a billing system to generate billing information based on the set of route targets.

10. The system of claim 9, wherein the billing system charges based on use of network resources.

11. The system of claim 7, further comprising a troubleshooting system to maintain information related to the set of route targets.

12. A computer-readable storage device comprising instructions that, when executed by a processor, cause the processor to perform operations comprising:
accessing network topology data specifying a network configuration of a network, wherein the network topology data includes a number of virtual routing and forwarding elements used by the network, and wherein the network includes customer edge routers and provider edge routers;
applying one or more rules to the network topology data to produce a plurality of route targets;
grouping a set of route targets from the plurality of route targets with respect to each customer edge router within the network to produce a group of route target sets;
removing duplicate route target sets from the group of route target sets to produce a reduced size of route target sets;
generating a data record including information related to the reduced size of route target sets;
storing the data record in a memory, wherein the memory includes data to map route target data for each of a plurality of provider edge routers of the network, and wherein the data indicates that two or more of the customer edge routers of the network that have a same set of route targets on one provider edge router of the network share one virtual routing and forwarding element; and
provisioning the network based on the data record that is stored in the memory.

13. The computer-readable storage device of claim 12, wherein provisioning the network based on the data record comprises generating one or more configuration commands based on the data record and sending the one or more configuration commands to one or more network elements.

14. The computer-readable storage device of claim 13, wherein the network topology data specifies one of a full mesh topology, a central service topology, and a hub and spoke topology.

15. The computer-readable storage device of claim 13, wherein the operations further comprise displaying a graphical representation of a logical topology at a terminal coupled to a computer system.

16. The computer-readable storage device of claim 13, wherein the network topology data includes a plurality of data entries, a first set of the data entries identifying customer edge routers, a second set of the data entries identifying provider edge routers corresponding to each of the customer edge routers, and a third set of the data entries identifying a topology type for each of a plurality of virtual private networks.

* * * * *